United States Patent
Bhatia

[19]
[11] Patent Number: 6,022,423
[45] Date of Patent: *Feb. 8, 2000

[54] METHOD FOR DEINKING PAPER

[75] Inventor: Sushil Bhatia, Framingham, Mass.

[73] Assignee: Imagex Technologies, Inc., Framingham, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/652,146

[22] Filed: May 23, 1996

[51] Int. Cl.[7] ........................................ B08B 3/08

[52] U.S. Cl. ..................... 134/19; 15/77; 162/5; 134/26; 134/29; 134/30

[58] Field of Search ............... 134/19, 25.1, 26, 134/29, 30; 162/5; 15/77

[56] References Cited

U.S. PATENT DOCUMENTS

| | | | |
|---|---|---|---|
| 1,586,905 | 6/1926 | Leightlitner | 15/4 |
| 2,859,460 | 11/1958 | Evangelisto | 15/4 |
| 3,792,913 | 2/1974 | Simmons | 355/7 |
| 4,201,015 | 5/1980 | Reim | 15/77 |
| 4,428,659 | 1/1984 | Howard | 354/317 |
| 4,657,598 | 4/1987 | Green | 134/9 |
| 4,733,422 | 3/1988 | Schramm et al. | 15/77 |
| 5,353,108 | 10/1994 | Tsukamoto | 355/296 |
| 5,364,501 | 11/1994 | Baret et al. | 162/5 |
| 5,463,447 | 10/1995 | Kurotori et al. | 355/202 |
| 5,528,788 | 6/1996 | Yamamoto et al. | 15/77 |

*Primary Examiner*—Peter A. Hruskoci
*Attorney, Agent, or Firm*—Iandiorio & Teska; Erik Fako

[57] ABSTRACT

A method of deinking paper includes applying a deinking solution to the paper to be deinked; the deinking solution being comprised of a cleaning solution and a surfactant; abrading the paper to remove the ink from the paper; and washing the paper to remove the deinking solution from the paper.

15 Claims, 4 Drawing Sheets

METHOD FOR DEINKING PAPER

FIELD OF INVENTION

This invention relates to a method and apparatus for deinking paper, and more particularly deinking paper which contains non-impact ink, e.g. toner printed thereon by photocopying techniques or laser printing.

BACKGROUND OF INVENTION

Paper waste constitutes 31% of all residential and commercial waste by weight and well over half by volume in the United States. Office waste paper from laser printers, photocopiers and facsimile machines comprise a significant portion of the total amount of waste paper in the U.S.

Printing on paper is accomplished by using two types of inks, namely, impact and non-impact. Impact inks are those produced by, for example, letter press and lithography techniques. Non-impact inks or "laser" inks are those produced, for example, in laser printing, photocopying and in facsimile machines. With impact printing the ink does not fuse into the paper and is, therefore, easy to remove from the paper. Papers printed on with impact methods have been successfully deinked for years. However, non-impact ink, i.e. toner, is difficult to remove because the ink particles fuse into the paper and to one another.

Presently, paper printed on with non-impact ink is recycled in large quantities in paper mill environments. Typically, that paper in large quantities is submitted to a chemical tank to soften the toner and the paper is then repulped to remove the toner. This process is expensive and does not produce high quality recycled paper. Moreover, there is a significant cost to individuals who recycle for hauling the paper to the remote recycling locations.

Small scale, individual recycling units which remove toner and are capable of recycling paper printed on with non-impact inks have been developed. One such device disclosed in U.S. Pat. No. 5,463,447 to Kurotori et al., removes toner from sheets of paper which was printed thereon by a photocopier. However, that device requires that the developer used in the photocopier be improved such that the adhering force of the toner is weak enough to allow the toner to be subsequently removed from the paper on which a toner image is formed. Thus, the device of that patent does not properly deink paper unless it was first printed on with a toner having a sufficiently weak adhering force.

Another device disclosed in U.S. Pat. No. 5,353,108 to Tsukamoto is used for cleaning printed paper, however, the paper to be cleaned must be erasable paper comprised of a substrate and a releasing layer. The paper is fed between an adhesion roller and a platen. There is a heat soluble resin in molten state on the surface of the adhesion roller and heat applied to the heat soluble resin by means of a heat source causes heat-soluble ink on the erasable paper to be enveloped therein and peeled from the surface of the paper.

These devices have very limited applications and may not be used generally with any piece of paper containing non-impact ink. That is, they are only useful with certain types of used paper, e.g. erasable, or with used paper that contains a specific toner with weak adhering forces.

Therefore, there is a need for a method and apparatus which is capable of deinking paper containing non-impact ink regardless of the type of paper or toner used in the printing process and one that will accomplish these objectives inexpensively and locally on a relatively small scale.

SUMMARY OF INVENTION

It is therefore an object of this invention to provide a method and apparatus for deinking paper containing ink printed thereon by any printing method and printed on any type of paper.

It is a further object of this invention to provide such a method and apparatus for deinking paper which is accomplished by a small, self-contained, sealed unit.

It is a further object of this invention to provide such a method and apparatus for deinking paper which produces high quality recycled paper that is completely reusable.

It is a further object of this invention to provide such a method and apparatus for deinking paper which is less expensive than prior methods.

It is a further object of this invention to provide such a method and apparatus for deinking paper regardless of the age of the paper.

It is a further object of this invention to provide such a method and apparatus for deinking paper which is extremely cost effective in comparison to purchasing new paper.

This invention results from the realization that paper containing ink including non-impact ink may be deinked and recycled very economically locally and on a small scale by applying a deinking solution to individual sheets of paper to be deinked comprised of a cleaning solution and a surfactant, abrading the paper to remove the non-impact ink from the paper and washing the paper to remove the deinking solution from the paper.

This invention features a method of deinking paper. The method includes applying a deinking solution to the paper to be deinked. The deinking solution being comprised of a cleaning solution and a surfactant. The method also includes abrading the paper to remove the ink from the paper and washing the paper to remove deinking solution from the paper.

In a preferred embodiment the cleaning solution and surfactant may be in a 10:1 ratio in the deinking solution. The cleaning solution may be sodium stearate-$CH_3(CH_2)_{16}COONa$. The surfactant may be selected from the group consisting of Triton X-155, Triton X-305, Triton X-405 and BRD 2311. The deinking solution may further include an enzyme in a ratio of 1:33 to the cleaning solution and surfactant. The enzyme may be BUZYME 2522. The deinking solution may further include a solvent in a ratio of 3:10 to the cleaning solution and surfactant or it may include a solvent in a ratio of 4:33 to the cleaning solution and surfactant. The solvent may be a C12–C14 aliphatic saturated hydrocarbon or it may an ether. The solvent may be Diethylene Glycol n-Butyl Ether. The method may further include drying the paper after the deinking solution is removed. The step of drying may include heating the paper to a temperature in the range between 60° and 70° C. The method may further include compressing the paper after the deinking solution is removed. The step of compressing may include heating the compressed paper. The compressed paper may be heated to a temperature in the range between 90° and 100° C. The method may further include heating the paper containing the deinking solution before the paper is abraded to soften the ink.

This invention also features a paper recycling system for deinking paper. The system includes means for applying a deinking solution to paper to be deinked. The deinking solution being comprised of a cleaning solution and a surfactant. There are means for abrading the paper to remove the ink from the paper and means for washing the paper to remove the deinking solution from the paper.

In a preferred embodiment the cleaning solution and surfactant may be in a 10:1 ratio in the deinking solution. The cleaning solution may be sodium stearate-$CH_3(CH_2)_{16}COONa$. The surfactant may be selected from the group consisting of Triton X-155, Triton X-305, Triton X-405 and BRD 2311. The deinking solution may further include an enzyme in a ratio of 1:33 to the cleaning solution and surfactant. The enzyme may be BUZYME 2522. The deinking solution may further include a solvent in a ratio of 3:10 to the cleaning solution and surfactant. The solvent may be in a ratio of 4:33 to the cleaning solution and surfactant. The solvent may be a C12–C14 aliphatic saturated hydrocarbon or it may be an ether. The solvent may be Diethylene Glycol n-Butyl Ether. There may further be included means for drying the paper after the deinking solution is removed. The means for drying may include means for heating the paper to a temperature in the range between 60° and 70° C. There may further be included means for compressing the paper. The means for compressing may include means for heating the compressed paper. The means for heating the compressed paper may heat the paper to a temperature in the range between 90° and 100° C. There may further be included means for heating the paper containing the deinking solution prior to submitting the paper to the means for abrading.

This invention further features a compact, self-contained, sealed recycling system for deinking paper containing non-impact ink. The system includes means for applying a deinking solution to individual sheets of paper to be deinked. The deinking solution being comprised of cleaning solution and a surfactant in a 10:1 ratio and a solvent in a ratio of 4:33 to the cleaning solution and surfactant. There are means for heating the sheets of paper containing the deinking solution and means for abrading the heated sheets of paper to remove the non-impact ink from the paper. There are means for washing the deinking solution from the sheets of paper and means for drying the sheets of paper after the deinking solution has been washed from the paper. There are also means for compressing the dried sheets of paper to remove from the paper any wrinkles present.

DISCLOSURE OF PREFERRED EMBODIMENT

Other objects, features and advantages will occur to those skilled in the art from the following description of a preferred embodiment and the accompanying drawings, in which.

Figure 1:
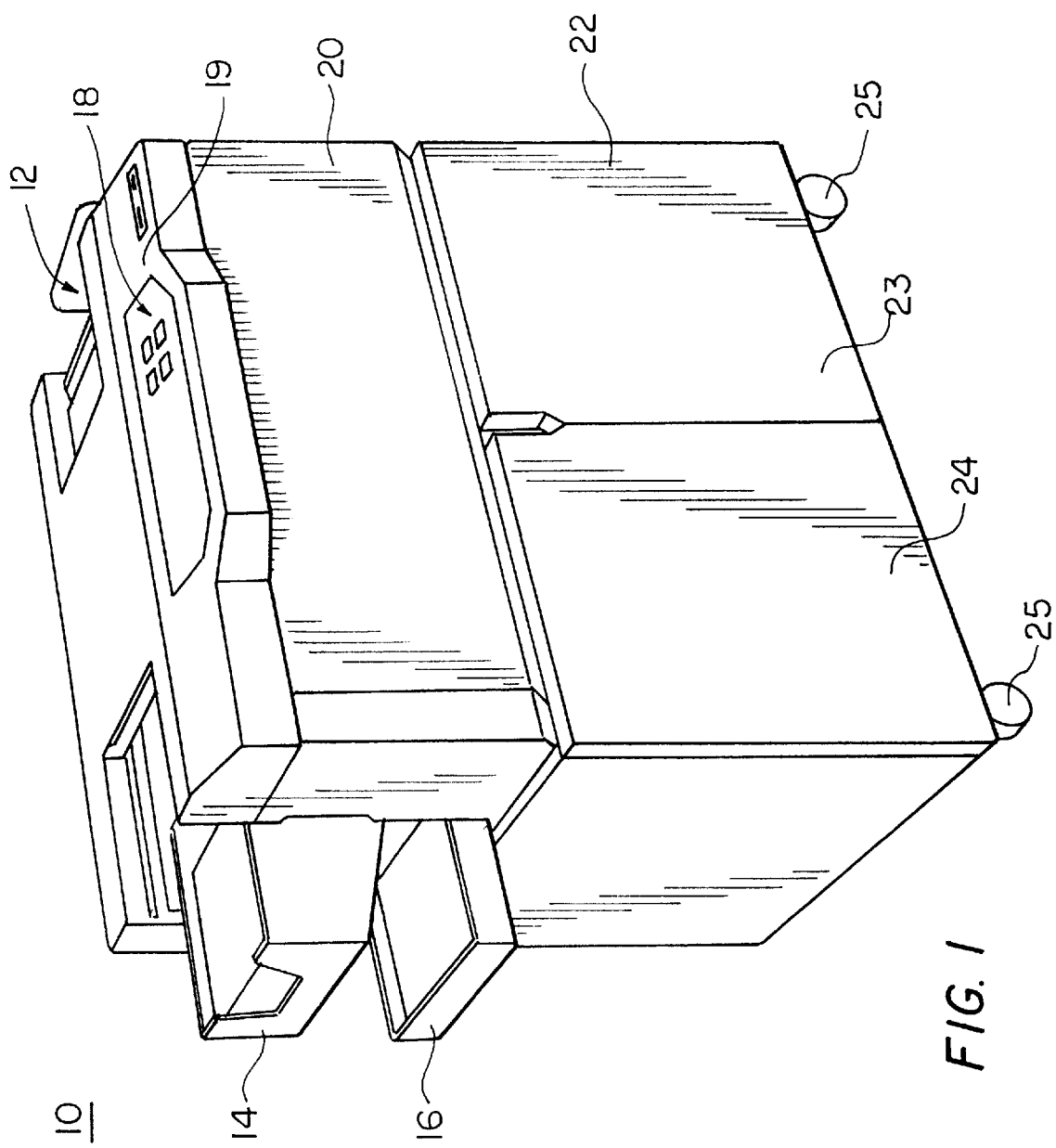
FIG. 1 is a perspective view of a paper recycling system for deinking paper according to this invention.

There is shown in FIG. 1 paper recycling system 10 for deinking paper. While this system is directed primarily to deinking paper containing non-impact ink, it is just as well suited for deinking paper containing impact ink. Non-impact ink is toner which is applied to paper by laser printers, photocopiers and facsimile machines, for example. System 10 is a compact, self-contained sealed unit having typical dimensions of 38 inches in length, 23.5 inches in width and 38 inches in height, and is very much suited for office environments. System 10 includes a used paper tray 12, cleaned paper tray 14 and a tray 16 for receiving rejected paper not capable of being recycled by system 10. System 10 operates under the control of control unit 18 which may include control panel 19 having typical indicator lights such as power on, ready, check paper, add wash, clean roller and switches for turning the power on and off, starting and stopping the cleaning process and a sensitivity slide used to indicate that a sheet has been completely cleaned or decopied or that it should be passed through system 10 for further cleaning.

Figure 2B:
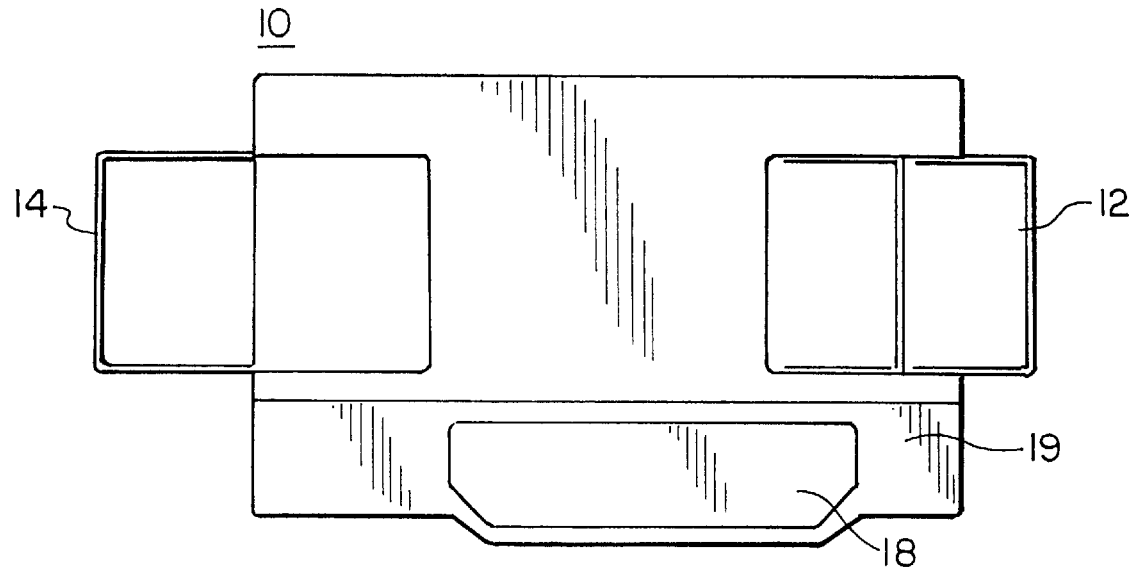
FIG. 2B is a schematic top plan view of the system of FIGS. 1 and 2A.
Figure 2A:
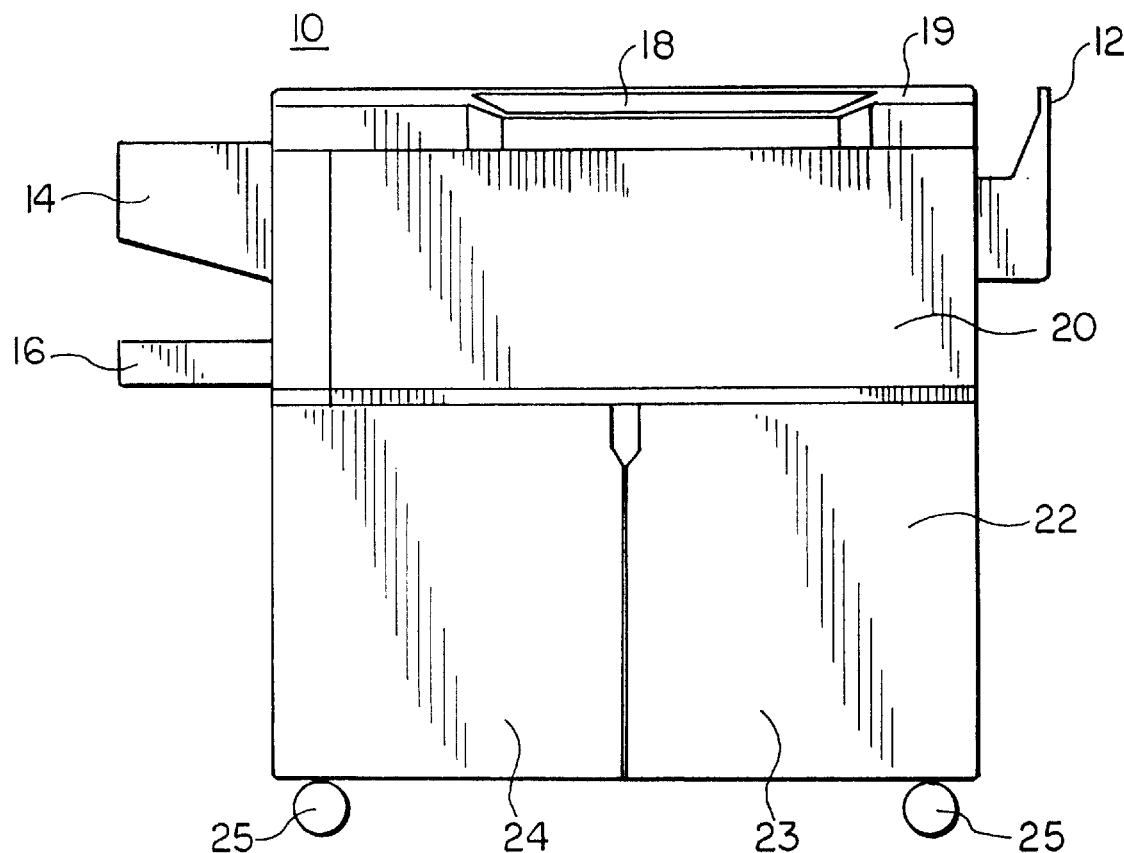
FIG. 2A is a schematic side elevational view of the system of FIG. 1.
Figure 3:
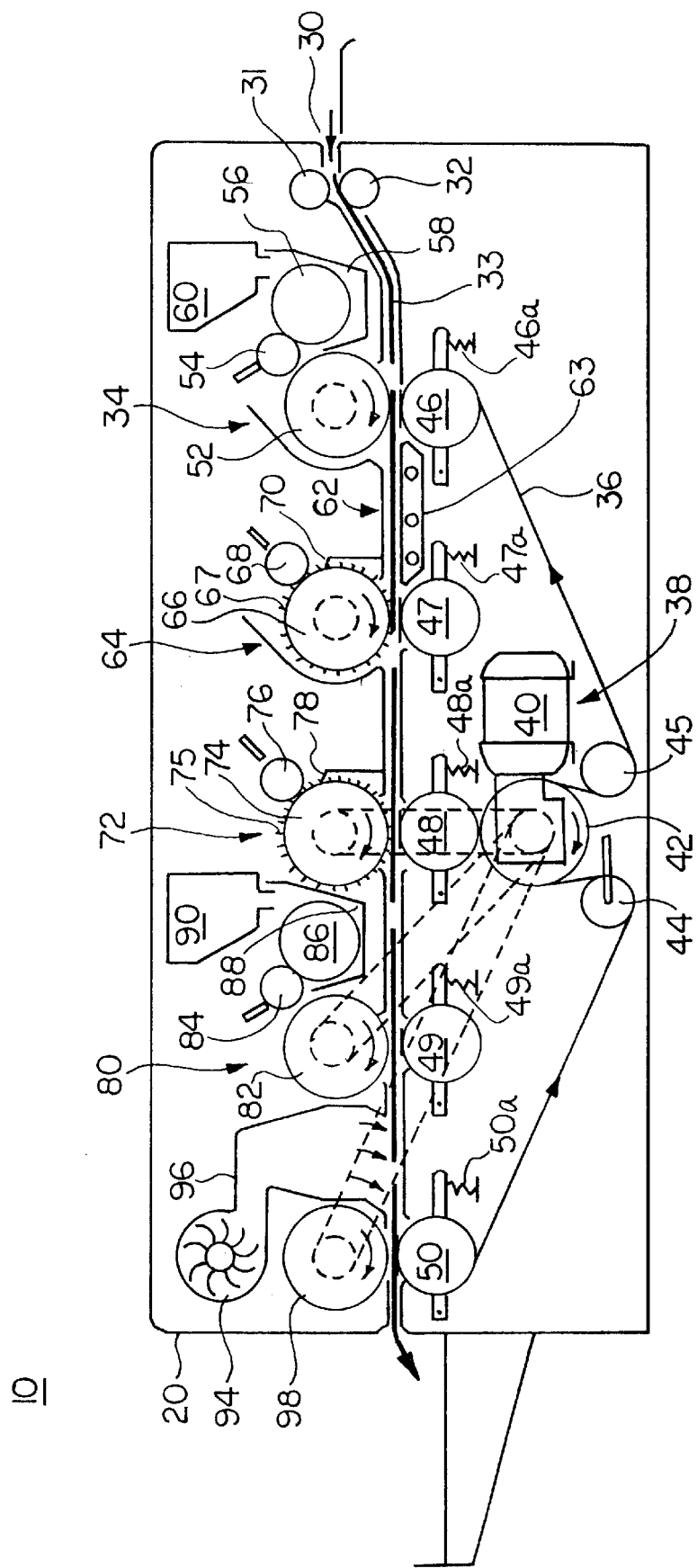
FIG. 3 is a schematic cross-sectional view of the system of FIGS. 1 and 2.

The cleaning, abrading and drying stations which accomplish the deinking according to this invention and which are depicted in FIG. 3 are contained within compartment 20. Compartment 22, which has doors 23 and 24, may be used for chemical storage. System 10 may be mounted on wheels 25, only two of which are shown in this view. Schematic side elevational and top plan views of system 10 are shown in FIGS. 2A and 2B, respectively.

Compartment 20, shown in detail in FIG. 3, receives paper at input 30 from used paper tray 12 (not shown). The paper is fed into compartment 20 by nip rollers 31 and 32 which provide individual sheets of used paper, e.g. sheet 33, to deinking solution applicator station 34 under the control of the control unit 19, FIG. 1. Proximate deinking solution applicator station 34, sheet 33 encounters driven carrier belt 36 which transports the sheets of used paper through compartment 20 until they are deposited within cleaned paper tray 14. Driven carrier belt 36 is propelled by main roller drive 38 which includes motor 40 that drives main roller 42 in the clockwise direction. Belt 36 is guided by idler rollers 44–50 and is driven in the counter-clockwise direction by main roller 42. Idler rollers 46–50 include spring tension adjustments 46a–50a which adjust the tension of driven carrier belt 36.

Station 34 includes primary roller 52 which is driven by main roller drive 38 to rotate in the clockwise direction. Roller 52 in conjunction with intermediate roller 54 impart rotation on deinking solution roller 56. Roller 56 is disposed in trough 58 which holds an amount of deinking solution supplied from reservoir 60. Reservoir 60 is preferably a removable cartridge much like a toner cartridge in, for example, a photocopier and it slowly dispenses the deinking solution into trough 58. As roller 56 rotates it transports deinking solution from tank trough 58 to intermediate roller 54, which in turn transfers the solution to primary roller 52. As sheets of paper are moved along on driven carrier belt 36, the solution from primary roller 52 is applied to each sheet.

The basic formulation for the deinking solution includes a cleaning solution and a surfactant in the ratio of 10:1. The cleaning solution may be a saturated solution of fatty acid soap or any type of liquid detergent; however, it is preferable to use sodium stearate-CH3(CH2) 16 COONa. The surfactant may be for example Triton X-155, Triton X-305, Triton X-405; however, the preferred surfactant is BRD-2311. The chemical composition of these surfactants are as follows:
Triton X-155
  Chemical Components: MethyleneBisdiamyl-Phenoxypolyethoxyethanol/67906-06-3; Isopropanol/67-63; water/7732-18-5; Polyethylene Glycol/25322-68-3.
  Manufacturer: Union Carbide
Triton X-305
  Chemical Components: Poly(Oxy-1,1,3,3-Tetramethylbutyl)Phenyl-W-Hydroxy/9036-19-5; Poly(oxy-1,2-Ethanediyl),A-Hydro-W-Hydroxy-/25322-68-3;water/7732-18-5
  Manufacturer: Union Carbide
Triton X-405
  Chemical Components: Octoxyphenoxypolyethoxyethanol/9036-19-5;water/7732-18-5;Polyethylene Glycol/ 25322-68-3

Manufacturer: Union Carbide
BRD-2311
Chemical Components: This surfactant is a trade secret; however, it is believed to be either an ethoxylated linear Alcohol or an ethoxylated Alkyl Phenol or both and it contains some Na+.
Manufacturer: Buckman Laboratories A preferred formulation for the deinking solution contains in addition to the cleaning solution and surfactant, a solvent in a ratio of 4:33 to the cleaning solution and surfactant mix. The solvent can be a C12–C14 aliphatic saturated hydrocarbon or an ether. It is preferred that the solvent be a solvent 900, specifically Diethylene Glycol n-Butyl Ether. In another formulation that same solvent may be mixed in a 3:10 ratio to the cleaning solution and surfactant mix.

An additional formulation which may be used includes adding an enzyme in a ratio in 1:33 to the basic formulation containing the cleaning solution and surfactant in a 10:1 ratio. The enzyme is preferably BUZYME 2522. This enzyme is manufactured by Buckman Laboratories and is also a trade secret. This formulation works best when the surfactant used is BRD-2311.

After each sheet of paper leaves station 34, it is transported to station 62 where the movement of driven carrier belt 36 is stopped for approximately 10–15 seconds in order to allow the non-impact ink (toner) to be softened by the deinking solution. Heat may be applied by heater 63 to facilitate softening of the toner.

After the non-impact ink has been softened, the paper is moved to abrading station 64 which includes primary roller 66 also driven by main roller drive 38. Primary roller 66 contains bristles 67 on its surface which gently abrade the surface of the paper as it passes through station 64. The bristles are typically formed of a low density polypropylene material. A comb roller may be used to remove the ink particles from the bristles on roller 66. The gentle abrasion removes most of the toner (more than 90%) without disturbing the fibers of the paper. Although roller 66 is configured to rotate in the direction of the movement of the sheets of paper through system 10, roller 66 could be rotated in the opposite direction. Secondary roller 68 contains a liquid absorbing material on its surface, such as felt, to absorb some of the deinking solution on the surface of primary roller 66. Scraper 70 removes the toner from the surface of primary roller 66. Second abrading station 72 is configured in the same manner as is first abrading station 64, in that it includes a primary roller 74, bristles 75, guide roller 76 and scraper 78. This station operates to provide additional scrubbing action to remove any remaining traces of toner.

Wash station 80 applies a wash solution, such as water, to the sheets to remove the deinking solution. Station 80 includes primary roller 82 which is driven by main roller drive 38, intermediate roller 84 and wash roller 86 disposed within trough 88. Wash roller 86 is in contact with the wash solution contained within trough 88 supplied from reservoir 90. Reservoir 90 is also preferably a removable cartridge which slowly dispenses the wash solution. Water from trough 88 is transferred from roller 86 to intermediate roller 84 which in turn transfers the water to roller 82. Roller 82 applies the wash liquid to the sheets as they pass through station 80.

Dryer station 92 includes a blower unit 94 and duct 96 which directs a heated air flow generated by blower 94 towards the surface of the paper sheets as they pass through dryer station 92 to dry the sheets. The air which impinges upon the sheets is typically heated at a temperature in the range of between 60° and 70° C. After the sheets exit the dryer station 92 they are provided to compression roller 98, driven by main roller drive 38, which may be heated at a temperature in the range of 90–100° C. This further dries the sheets before they are deposited within clean paper tray 14 and removes from the paper any wrinkles that may be present.

Figure 4:
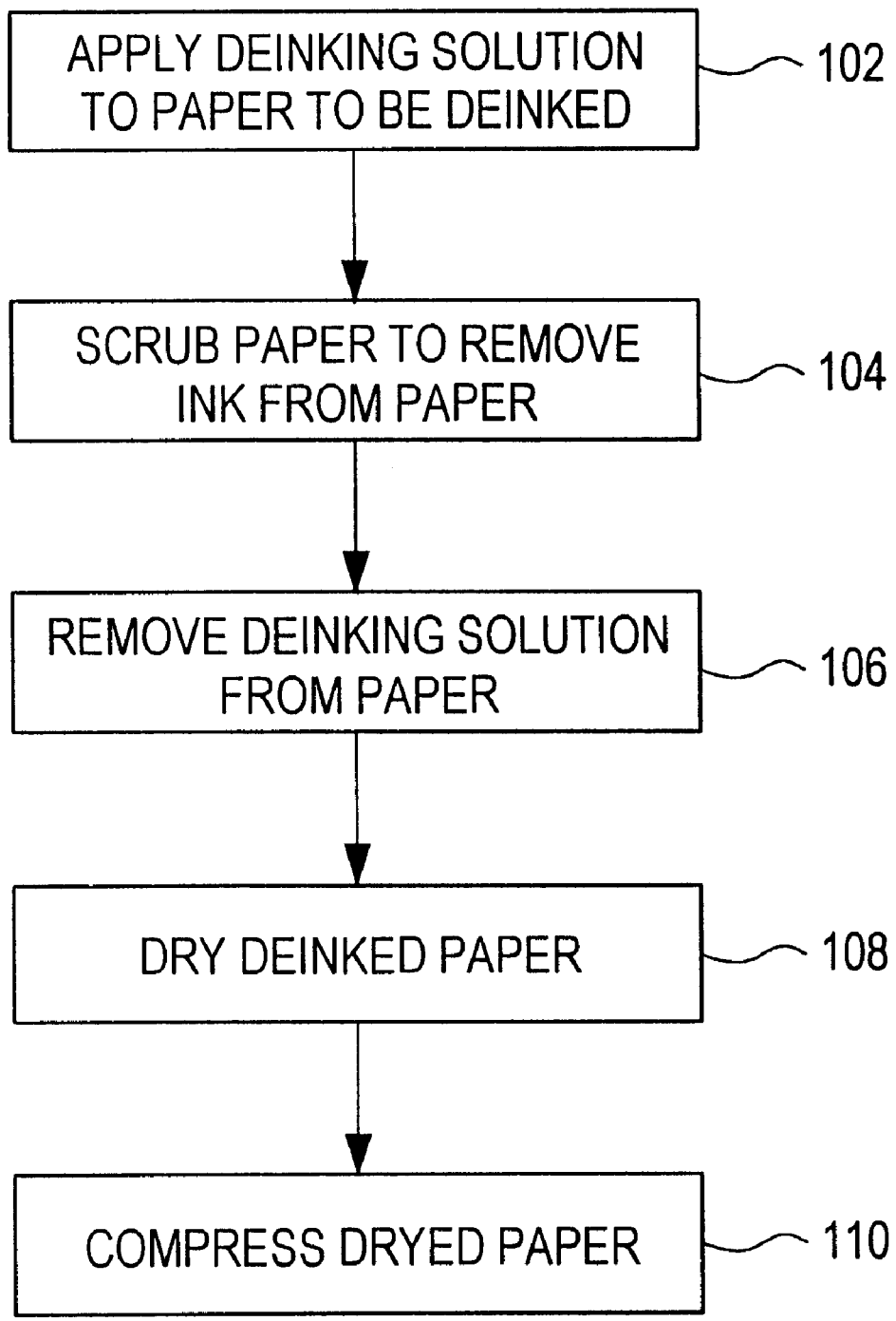
FIG. 4 is a flow chart depicting the deinking method of this invention.

Flow chart 100, FIG. 4, illustrates the method of deinking according to this invention. In step 102 the deinking solution which is formulated as described above, is applied to the used paper which is to be deinked. The paper is then gently scrubbed at step 104 to remove the non-impact ink (toner) from the paper but not disturb the fibers of the paper and at step 106 the deinking solution is removed by washing the paper with, for example, water. In step 108 the deinked paper is dried and at step 110 the dried paper is compressed to further dry the paper and to remove from the paper any wrinkles that may be present.

The system and method of this invention produces high quality recycled paper cost effectively on a relatively small scale from any type of paper of any age containing non-impact ink printed thereon by any non-impact ink printing method.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A method of deinking paper, the method comprising:
applying a deinking solution to the paper to be deinked; said deinking solution being comprised of a cleaning solution and a surfactant;
abrading the paper to remove the ink from the paper; and
washing the paper to remove said deinking solution from the paper.

2. The method of claim 1 in which said cleaning solution and said surfactant are in a 10:1 ratio in said deinking solution.

3. The method of claim 2 in which said deinking solution further includes an enzyme in a ratio of 1:33 to said cleaning solution and surfactant.

4. The method of claim 2 in which said deinking solutiop further includes a solvent in a ratio of 3:10 to said cleaning solution and surfactant.

5. The method of claim 2 in which said deinking solution further includes a solvent in a ratio of 4:33 to said cleaning solution and surfactant.

6. The method of claims 4 or 5 in which said solvent is a C12–C14 aliphatic saturated hydrocarbon.

7. The method of claims 4 or 5 in which said solvent is an ether.

8. The method of claims 4 or 5 in which said solvent is Diethylene Gycol n-Butyl Ether.

9. The method of claim 1 in which said cleaning solution is sodium stearate-CH3(CH2) 16 COONa.

10. The method of claim 1 further including drying the paper after said deinking solution is removed.

11. The method of claim 10 in which the step of drying includes heating the paper to a temperature in the range between 60° and 70° C.

12. The method of claim 1 further including compressing the paper after said deinking solution is removed.

13. The method of claim 12 in which the step of compressing includes heating the compressed paper to dry said paper.

14. The method of claim 13 in which the compressed paper is heated to a temperature in the range between 90° and 100° C.

15. The method of claim 1 further including heating the paper containing the deinking solution before the paper is abraded to soften the ink.

* * * * *